United States Patent
Ye

(10) Patent No.: US 11,703,985 B2
(45) Date of Patent: Jul. 18, 2023

(54) TOUCH DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Jian Ye, Wuhan (CN)

(73) Assignee: WUHAN CHINA STAR OPTOELECTRONICS SEMICONDUCTOR DISPLAY TECHNOLOGYCO., LTD., Wuhan (CN)

( * ) Notice: Subject to any disclaimer, the term of this patent is extended or adjusted under 35 U.S.C. 154(b) by 284 days.

(21) Appl. No.: 17/254,215

(22) PCT Filed: Jul. 27, 2020

(86) PCT No.: PCT/CN2020/104837
§ 371 (c)(1),
(2) Date: Dec. 18, 2020

(87) PCT Pub. No.: WO2022/011742
PCT Pub. Date: Jan. 20, 2022

(65) Prior Publication Data
US 2022/0276741 A1 Sep. 1, 2022

(30) Foreign Application Priority Data
Jul. 15, 2020 (CN) .......................... 202010679786.X

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/0443* (2019.05); *G06F 2203/04111* (2013.01)

(58) Field of Classification Search
None
See application file for complete search history.

(56) References Cited

U.S. PATENT DOCUMENTS

2012/0044182 A1* 2/2012 Seo .................. G06F 3/0445
                                                                 345/173
2016/0034077 A1* 2/2016 Hsieh .................. G02F 1/13338
                                                                 345/173

(Continued)

FOREIGN PATENT DOCUMENTS

CN    106293225 A    1/2017
CN    109375821 A    2/2019
(Continued)

OTHER PUBLICATIONS

International Search Report in International application No. PCT/CN2020/104837, dated Mar. 25, 2021.

(Continued)

*Primary Examiner* — Duane N Taylor, Jr.
(74) *Attorney, Agent, or Firm* — PV IP PC; Wei Te Chung; Zhigang Ma

(57) ABSTRACT

A touch display device is provided. The touch display device includes a touch layer and a display panel. The touch layer is located on a light emitting side of the display panel. The display panel includes a plurality of sub-pixels. The touch layer includes a plurality of touch units, and each of the touch units includes a first electrode electrically connected by a first connecting portion in a first direction. A width of the first connecting portion in a direction perpendicular to an extending direction of the first connecting portion is greater (Continued)

than or equal to a width of 3 sub-pixels, and the first connecting portion and the first electrode are provided in a same layer.

18 Claims, 7 Drawing Sheets

(56) References Cited

U.S. PATENT DOCUMENTS

2019/0179452 A1   6/2019   Jeon et al.
2020/0183538 A1*  6/2020   Li ..................... G02F 1/13338

FOREIGN PATENT DOCUMENTS

CN   110034168 A   7/2019
CN   110764636 A   2/2020

OTHER PUBLICATIONS

Written Opinion of the International Search Authority in International application No. PCT/CN2020/104837, dated Mar. 25, 2021.

* cited by examiner

TOUCH DISPLAY DEVICE

RELATED APPLICATIONS

This application is a Notional Phase of PCT Patent Application No. PCT/CN2020/104837 having international filing date of Jul. 27, 2020, which claims the benefit of priority of Chinese Patent Application No. 202010679786.X filed on Jul. 15, 2020. The contents of the above applications are all incorporated by reference as if fully set forth herein in their entirety.

FIELD OF INVENTION

The present invention relates to the field of touch technologies, and in particular, to a touch display device.

BACKGROUND OF INVENTION

Capacitive touch screens are widely used in various electronic interactive scene devices due to their high durability, long life, and support for multi-touch functions. The capacitive touch screens detect specific positions of finger touches by detecting changes of capacitance at positions of the finger touches.

Shown in FIG. 1 is a schematic view of traditional touch electrodes. The touch electrodes comprise driving electrodes Tx and sensing electrodes Rx, and both the driving electrodes Tx and the sensing electrodes Rx are composed of metal wires. Since sub-pixels are arranged in an inclined 45-degree arrangement, the metal wires composing the driving electrodes Tx and the sensing electrodes Rx are a plurality of rhombic wires consisting of wires inclined at 45 degree and 135 degree, and the driving electrodes Tx and the sensing electrodes Rx are electrically insulated from each other. Two adjacent sensing electrodes Rx are connected by two pairs of V-shaped bridge wires 1. In order to adapt to layout designs of the sub-pixels, the V-shaped bridge wire also uses a metal wire design to prevent blocking light emitted by the sub-pixels. Two adjacent driving electrodes Tx are formed continuously, and two adjacent driving electrodes Tx are connected by a connecting portion 2. The driving electrodes Tx, the sensing electrodes Rx, and the connecting portion 2 are disposed on a same layer, and the V-shaped bridge wire 1 and the sensing electrodes Rx are located on different layers. In traditional technologies, in order to prevent too much basic capacitance between the V-shaped bridge wire 1 and the driving electrode Tx, the connecting portion 2 is made to surround a sub-pixel in an extending direction perpendicular to the connecting portion 2, so as to reduce an overlapping area between the V-shaped bridge wire 1 and the driving electrode Tx. However, the connecting portion 2 surrounds the sub-pixel in the extending direction perpendicular to the connecting portion 2 will cause an impedance of the connecting portion 2 to be relatively large.

Therefore, it is necessary to propose a technical solution to solve the problem of large impedance of the connecting portion 2 provided on the same layer as the driving electrode Tx.

Technical Problem

An objective of the present invention is to provide a touch display device to reduce an impedance of a first connecting portion provided on a same layer as a first electrode.

Technical Solution

In order to achieve the above objective, the present invention provides a touch display device. The touch display device comprises a touch layer and a display panel, wherein the touch layer is located on a light emitting side of the display panel, the display panel comprises a plurality of sub-pixels, the touch layer comprises a plurality of touch units, and each of the touch units comprises:

a first electrode electrically connected by a first connecting portion in a first direction, a width of the first connecting portion in a direction perpendicular to an extending direction of the first connecting portion is greater than or equal to a width of 3 sub-pixels, and the first connecting portion and the first electrode are provided in a same layer.

In the above touch display device, each of the touch units further comprises a second electrode bridged by a second connecting portion in a second direction, the second connecting portion comprises at least one second metal wire extending in the second direction, and each second metal wire comprises a plurality of second surrounding sections arranged in the second direction and arranged side by side; and the second connecting portion and the first connecting portion are located on different layers, the second electrode is electrically insulated from the first electrode, and the first direction is different from the second direction.

In the above touch display device, an orthographic projection of the second connecting portion on the touch layer intersects an orthographic projection of the first connecting portion on the touch layer and forms a plurality of wire patterns.

In the above touch display device, the first electrode and the second electrode are composed of multiple metal wires; and in each of the wire patterns, a length of an overlapping portion of the orthographic projection of the first connecting portion on the touch layer and the orthographic projection of the second connecting portion on the touch layer is greater than 0 and less than a length of each of the metal wires.

In the above touch display device, in each of the wire patterns, the length of the overlapping portion of the orthographic projection of the first connecting portion on the touch layer and the orthographic projection of the second connecting portion on the touch layer is greater than 0 or equal to ½ of the length of each of the metal wires.

In the above touch display device, each first connecting portion comprises at least three first metal wires extending in the first direction and spaced apart from each other, and/or each second connecting portion comprises a plurality of the second metal wires extending in the second direction and spaced apart from each other.

In the above touch display device, each first connecting portion comprises at least three first metal wires extending in the first direction and spaced apart from each other, each first metal wire comprises at least one first surrounding section arranged along the first direction, and each first surrounding section of the first metal wire is a part of each of the metal wires;

each of the second connecting portions comprises a plurality of the second metal wires extending in the second direction and spaced apart from each other, and each of the second surrounding sections of each of the second metal wires is a part of each of the metal wires; and the first surrounding section of each first metal wire corresponds to the second surrounding section of each second metal wire in a one-to-one correspondence, and an orthographic projection of each first surrounding section on the touch layer and an orthographic projection of the second surrounding section corresponding to the first surrounding section on the touch layer partially overlap and form one of the wire patterns.

In the above touch display device, a length of each first surrounding section is greater than 0 and less than or equal to ½ of the length of each metal wire, and a length of each second surrounding section is greater than 0 and less than or equal to ½ of the length of each metal wire.

In the above touch display device, each first surrounding section and each second surrounding section corresponding to the first surrounding section collectively surround one of the sub-pixels.

In the above touch display device, the metal wires comprise elliptical metal wires, and both the first surrounding section and the second surrounding section comprise elliptical arc sections.

In the above touch display device, at least one of the wire patterns is same as one of the metal wires, and/or at least one of the wire patterns is a part of the metal wire.

In the above touch display device, the width of the first connecting portion in the direction perpendicular to the extending direction of the first connecting portion is less than or equal to a width of 10 sub-pixels.

In the above touch display device, each first electrode comprises two first narrowed trunks and two first trunk electrodes connected by the first connecting portion, each of the first trunk electrodes is connected to one of the first narrowed trunks, and each of the first trunk electrodes extends in the first direction; and each second electrode comprises two second narrowed trunks and two second trunk electrodes connected by the second connecting portion, each of the second trunk electrodes is connected to one of the second narrowed trunks, each of the second trunk electrodes extends in the second direction, and the first direction is perpendicular to the second direction.

In the above touch display device, a width of the first trunk electrode is greater than or equal to a width of 5 sub-pixels, a width of the first narrowed trunk in a width direction of the first trunk electrode is greater than or equal to the width of 3 sub-pixels, and the width of the first narrowed trunk along the width direction of the first trunk electrode decreases from being close to the first trunk electrode to away from the first trunk electrode; and a width of the second trunk electrode is greater than or equal to the width of 5 sub-pixels, the width of the second narrowed trunk in a width direction of the second trunk electrode is greater than or equal to the width of 3 sub-pixels, and the width of the second narrowed trunk in the width direction along the second trunk electrode decreases from being close to the second trunk electrode to away from the second trunk electrode.

In the above touch display device, each first electrode further comprises a first branch electrode extending from an end of the first trunk electrode close to the first connecting portion, the second electrode further comprises a second branch electrode extending from an end of the second trunk electrode close to the second connecting portion, and each second branch electrode surrounds one of the first branch electrodes adjacent to the second branch electrode.

In the above touch display device, two adjacent second branch electrodes of two adjacent touch units in the second direction are connected at an end away from the second connecting portion.

In the above touch display device, in the second direction, an area enclosed by the second trunk electrodes and the two adjacent second branch electrodes in the two adjacent touch units is provided with a first hollow portion, the first hollow portion is provided with a first floating electrode, and the first floating electrode is electrically insulated from the first electrode and the second electrode.

In the above touch display device, in the first direction, an area enclosed by the first trunk electrodes and the two adjacent second branch electrodes in the two adjacent touch units is provided with a second hollow portion, a second floating electrode is provided in the second hollow portion, and the second floating electrode is electrically insulated from the first electrode and the second electrode.

BENEFICIAL EFFECT

The present invention provides a touch display device. The touch display device comprises a touch layer and a display panel. The touch layer is located on a light emitting side of the display panel. The display panel comprises a plurality of sub-pixels. The touch layer comprises a plurality of touch units, and each of the touch units comprises a first electrode electrically connected by a first connecting portion in a first direction. A width of the first connecting portion in a direction perpendicular to an extending direction of the first connecting portion is greater than or equal to a width of 3 sub-pixels, and the first connecting portion and the first electrode are provided in a same layer. Compared with a first connecting portion surrounds one sub-pixel in a traditional technology, the present invention reduces an impedance of a first connecting portion by making the first connecting portion surround at least 3 sub-pixels in an extending direction of the first connecting portion to reduce the impedance of the first connecting portion, a resistance-capacitance delay of an electric signal conducted by the first electrode is effectively reduced, and a touch scanning frequency is increased, which is beneficial to improve a touch report rate.

Figure 1:
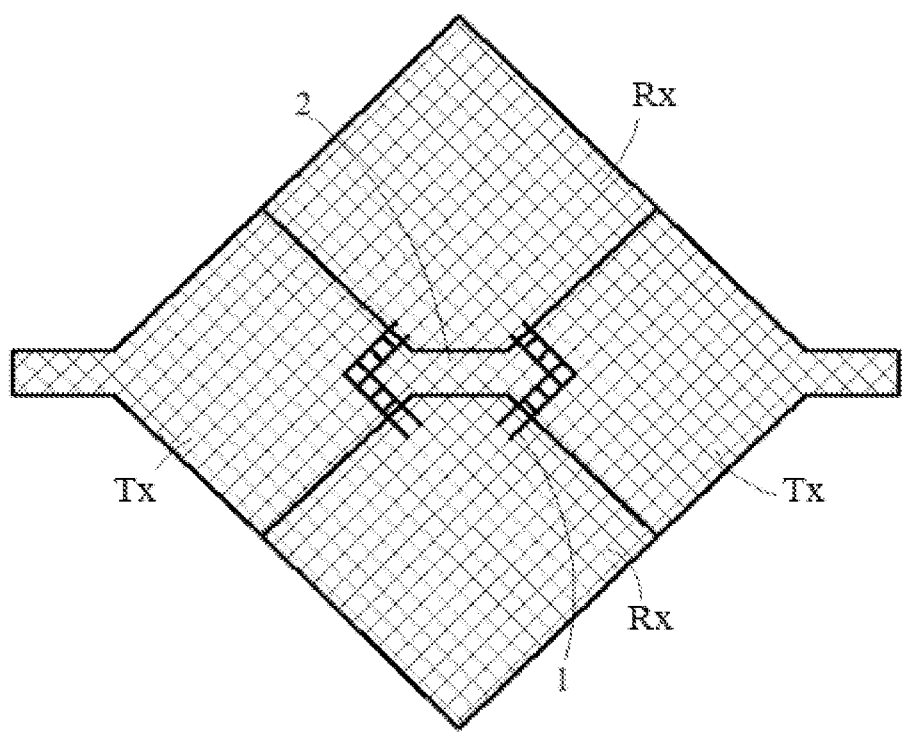
FIG. 1 is a schematic view of traditional touch electrodes.

Reference numerals in the drawings are shown as follows:
10: display panel; 101: substrate; 102: thin film transistor array layer; 103: OLED array layer; 104: packing layer; 20: touch component; 30: polarizer; 40: protective cover; 50: touch layer; 501: touch unit; 5011: first electrode; 50111: first trunk electrode; 50112: first branch electrode; 50113: first narrowed trunk; 5012: second electrode; 50121: second trunk electrode; 50122: second branch electrode; 50123: second narrowed trunk; 502: first lead; 503: second lead; 504: first connecting portion; 5041: first metal wire; 5041a:

first surrounding section; 501a: first metal connecting section; 501b: second metal connecting section; 505: second connecting portion; 5051: second metal wire; 5051a: second surrounding section; 5061: first floating electrode; 5062: second floating electrode; 5063: third floating electrode; 5071: first hollow portion; 5072: second hollow portion.

DETAILED DESCRIPTION OF PREFERRED EMBODIMENTS

The following will clearly and completely describe the technical solutions in the embodiments of the present invention with reference to the drawings in the embodiments of the present invention. Obviously, the described embodiments are only a part of the embodiments of the present invention, rather than all the embodiments. Based on the embodiments in the present invention, all other embodiments obtained by those skilled in the art without creative work are within the protection scope of the present invention.

The present invention provides a touch display device. The touch display device comprises a touch component and a display panel. The touch component is configured to generate a corresponding touch control signal based on a touch operation of a user's finger. The display panel is used for screen display. The display panel comprises a plurality of sub-pixels. The touch components can be externally hung outside the display panel or embedded in the display panel. The display panel can be a liquid crystal display panel or an organic light emitting diode display panel. The touch display device can be a flexible touch display device or a hard touch display device.

In order to facilitate the description of the technical solutions of the present invention, the present invention is described by taking the touch component located on a light emitting side of the display panel, and the display panel is an organic light emitting diode display panel as an example.

Figure 2:
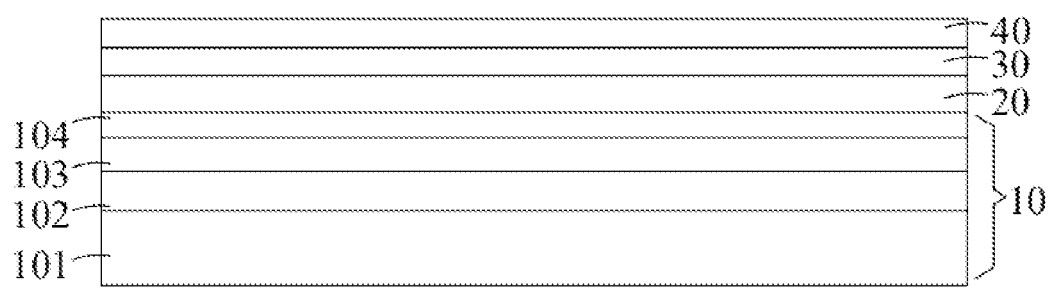
FIG. 2 is a schematic view of a touch display device of the present invention.

Please refer to FIG. 2, which is a schematic view of the touch display device of the present invention. The touch display device comprises a display panel 10, a touch component 20, a polarizer 30, and a protective cover 40. The display panel 10 comprises a substrate 101, a thin film transistor array layer 102, an organic light emitting diode array layer 103, and a packing layer 104.

The substrate 101 is configured to provide a support carrier for the thin film transistor array layer 102 and other film layers. The substrate 101 is a polyimide layer. In other embodiments, the substrate 101 may also be a glass substrate.

The thin film transistor array layer 102 comprises a plurality of thin film transistors arranged in an array. Thin film transistors are configured as driving elements of organic light emitting diodes. The thin film transistor can be a polysilicon thin film transistor, a metal oxide thin film transistor, or an amorphous silicon thin film transistor.

The organic light emitting diode array layer 103 comprises a plurality of organic light emitting diodes arranged in an array. The plurality of organic light emitting diodes arranged in an array comprise red light organic light emitting diodes, blue light organic light emitting diodes, and green light organic light emitting diodes. Each organic light emitting diode is a sub-pixel. The red organic light emitting diode is a red sub-pixel R, the blue organic light emitting diode is a blue sub-pixel B, and the green organic light emitting diode is a green sub-pixel G. The plurality of organic light emitting diodes arranged in an array comprise a plurality of independent anodes, an organic light emitting layer corresponding to each anode, and a common cathode.

The packing layer 104 is configured to prevent water vapor and oxygen from corroding the organic light emitting layer and the common cathode. The packaging layer 104 is a thin film packaging layer. A thickness of the thin film packaging layer is 2 micrometers to 15 micrometers, such as 4 micrometers, 6 micrometers, 8 micrometers, 10 micrometers, or 14 microseconds, etc. In other embodiments, the packaging layer 104 may also be a glass packaging cover plate.

The polarizer 30 is configured to reduce a reflectivity of ambient light incident on the display panel 10 to improve a contrast of the touch display device during display. The polarizer 30 is a circular polarizer. The protective cover 40 is configured to protect the polarizer 30 and other film layers. The packing layer 104 is disposed between the touch component 20 and the organic light emitting diode array layer 103. The touch component 20 comprises a touch layer 50.

Figure 3:
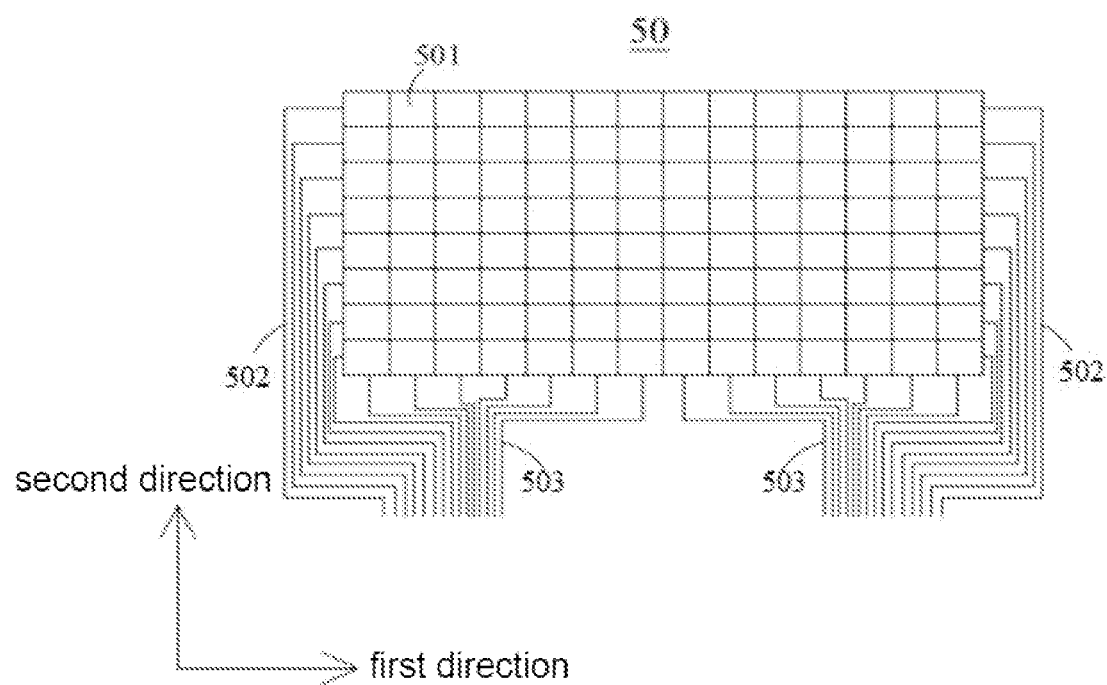
FIG. 3 is a schematic view of a frame of a touch layer of the present invention.
Figure 4:
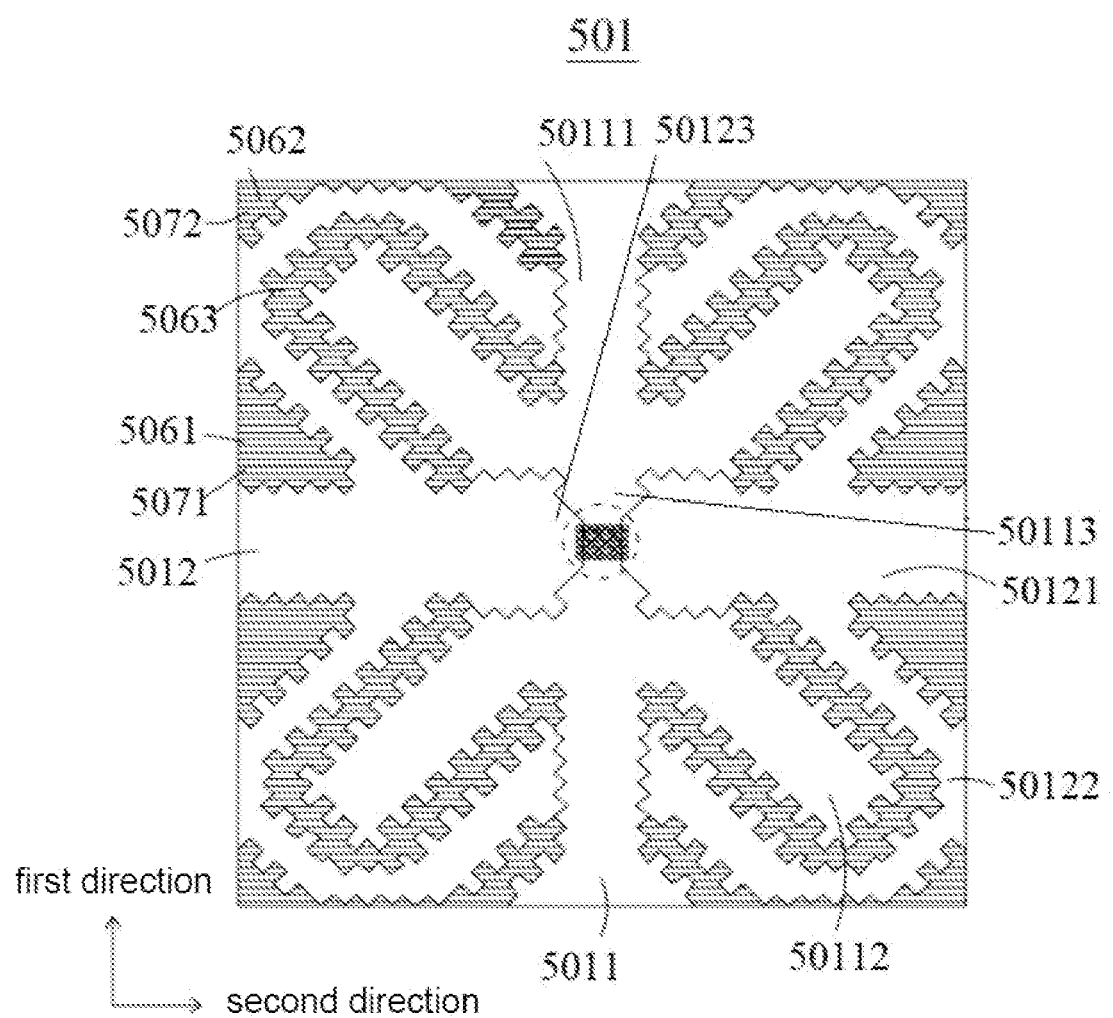
FIG. 4 is a schematic view of each touch unit of the touch layer shown in FIG. 3.
Figure 5:
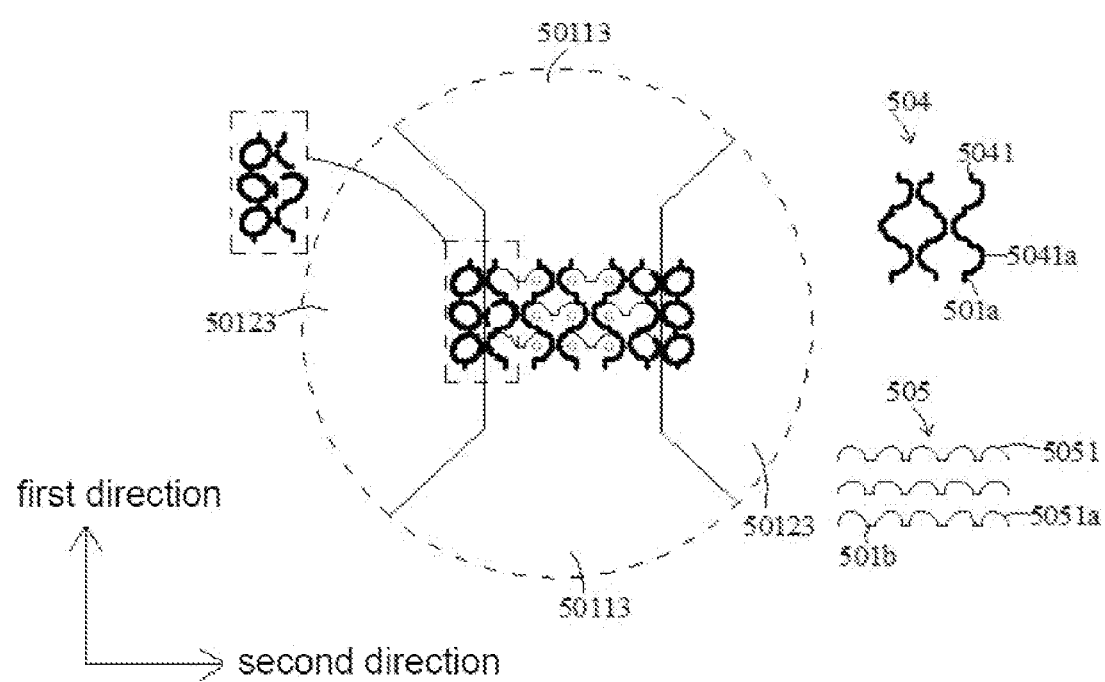
FIG. 5 is a first enlarged schematic view of the touch unit shown in FIG. 4 at an intersection of a first electrode and a second electrode.
Figure 6:
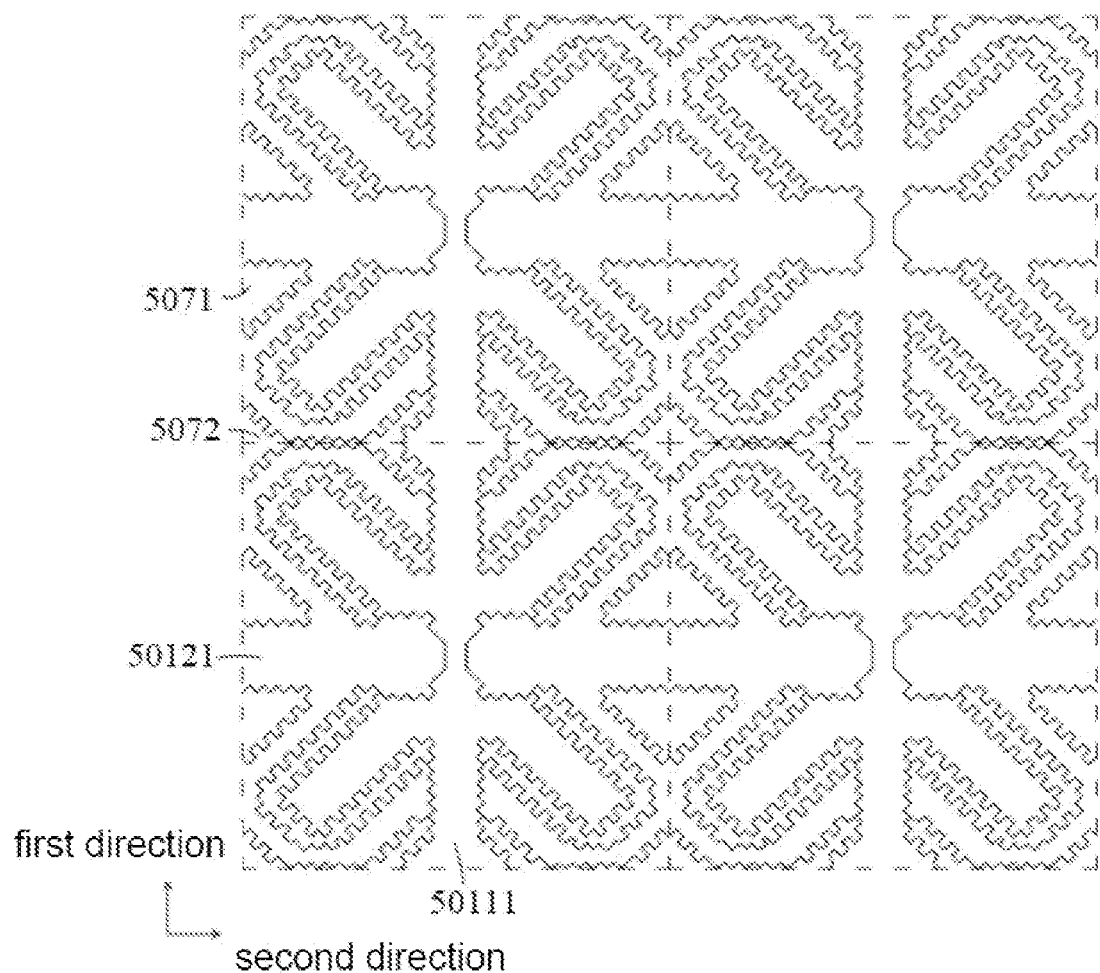
FIG. 6 is a schematic view of an arrangement of a plurality of touch units disposed in an array shown in FIG. 3.

Please refer to FIG. 3 to FIG. 6. FIG. 3 is a schematic view of a frame of the touch layer of the present invention. FIG. 4 is a schematic view of the touch unit shown in FIG. 3. FIG. 5 is an enlarged schematic view of the touch unit shown in FIG. 4 at an intersection of a first electrode and a second electrode. FIG. 6 is a schematic view of an arrangement of a plurality of touch units disposed in an array shown in FIG. 3.

The touch layer 50 comprises a plurality of touch units 501 arranged in an array, a plurality of first leads 502, and a plurality of second leads 503. The touch display device further comprises a touch chip (not shown).

A size of the touch layer 50 along a first direction is greater than a size of the touch layer 50 along a second direction, and the first direction and the second direction are different. Each touch unit 501 comprises a first electrode 5011 and a second electrode 5012, and the first electrode 5011 and the second electrode 5012 are electrically insulated. Each touch unit 501 is square.

In each touch unit 501, the first electrode 5011 is electrically connected through a first connecting portion 504, and the second electrode 5012 is bridged through a second connecting portion 505. The first connecting portion 504 is provided in a same layer as the first electrode 5011 and the second electrode 5012, and the second connecting portion 505 and the first connecting portion 504 are disposed in different layers.

The first electrodes 5011 in the touch unit 501 arranged side by side in the first direction are electrically connected and form a first electrode channel. Two ends of each first electrode channel are connected to the first lead 502. The second electrodes 5012 in the touch unit 501 arranged side by side in the second direction are electrically connected to form a second electrode channel, and one end of each second electrode channel is connected to the second lead 503. There is a plurality of first electrode channels in the second direction and a plurality of second electrode channels in the first direction. The number of first electrode channels in the second direction is less than the number of second electrode channels in the first direction.

In the embodiment, the first electrode 5011 is a driving electrode, and the second electrode 5012 is a sensing electrode. The number of first electrode channels is 2n, and n is an integer greater than or equal to 1, so as to improve a touch report rate. When a scan signal is input to the first electrode channel, usually 2, 4, 8, or 16 first electrode channels are configured as a group of input scan signals, for example, 4 first electrode channels are a group of input scan signals at the same time. If the number of first electrode channels is an odd number, for example, when the number of first electrode channels is 17, and 4 first electrode channels are grouped for scanning, it needs to scan 5 times to scan all the first electrode channels, which will increase a scan sampling time and reduce the touch report rate.

As shown in FIG. 4 and FIG. 5. FIG. 5 is a first enlarged schematic view of the touch unit shown in FIG. 4 at the intersection of the first electrode and the second electrode of the touch unit. Each first electrode 5011 comprises two first narrowed trunks 50113 and two first trunk electrodes 50111 connected by the first connecting portion 504. Each first trunk electrode 50111 is connected to a first narrowed trunk 50113, and each first trunk electrode 50111 extends in the first direction. The first narrowed trunk 50113 is disposed at the intersection of the first electrode 5011 and the second electrode 5012. The first trunk electrode 50111 facilitates a conduction of current parallel to the first trunk electrode 50111, reduces an impedance of the first electrode channel, reduces time required for scanning of the touch display device, and improves the touch report rate.

Each first electrode 5011 further comprises a first branch electrode 50112 extending from an end of the first trunk electrode 50111 close to the first connecting portion 504. Each first trunk electrode 50111 extends two first branch electrodes 50112 disposed symmetrically with respect to the first trunk electrode 50111 close to the intersection of the first electrode 5011 and the second electrode 5012. An angle between the first branch electrode 50112 and the first trunk electrode 50111 is equal to 45 degrees. The first trunk electrode 50111 is rectangular. The first branch electrode 50112 surrounds at least two sub-pixels in a width direction of the first branch electrode 50112.

A width of the first trunk electrode 50111 is greater than or equal to a width of 5 sub-pixels, a width of the first narrowed trunk 50113 in a width direction of the first trunk electrode 50111 is greater than or equal to a width of 3 sub-pixels, and a width of the first narrowed trunk 50113 in the width direction of the first trunk electrode 50111 decreases from being close to the first trunk electrode 50111 to far away from the first trunk electrode 50111.

Specifically, in the embodiment, since the first trunk electrode and the first narrowed trunk are both composed of metal wires, each metal wire surrounds a sub-pixel to prevent the metal wire from blocking light emitted by the sub-pixel. The first trunk electrode 50111 surrounds at least 5 sub-pixels along the width direction of the first trunk electrode 50111 to realize that the width of the first trunk electrode 50111 is greater than or equal to the width of 5 sub-pixels. The first narrowed trunk 50113 surrounds at least 3 sub-pixels in the width direction of the first trunk electrode 50111 to realize that the width of the first narrowed trunk 50113 in the width direction of the first trunk electrode 50111 is greater than or equal to the width of 3 sub-pixels. The first narrowed trunk 50113 surrounds at least 3 sub-pixels in the width direction of the first trunk electrode 50111 to reduce the impedance of the first electrode channel at the intersection of the first electrode 5011 and the second electrode 5012, thereby reducing a first RC delay of the first electrode channel. In addition, the width of the first narrowed trunk 50113 is reduced to reduce a basic capacitance between the first electrode 5011 and the second electrode 5012, and the time required for the touch layer 50 to be scanned is reduced, thereby increasing the touch report rate.

Each second electrode 5012 comprises two second narrowed trunks 50123 and two second trunk electrodes 50121 connected by the second connecting portion 505. Each second trunk electrode 50121 is connected to a second narrowed trunk 50123, and each second trunk electrode 50121 extends in the second direction. Each second narrowed trunk 50123 is disposed at the intersection of the first electrode 5011 and the second electrode 5012, and the first direction is perpendicular to the second direction.

The second electrode 5012 further comprises a second branch electrode 50122 extending from an end of the second trunk electrode 50121 close to the second connecting portion 505. Each second branch electrode 50122 surrounds one first branch electrode 50112 adjacent to the second branch electrode 50122 to increase a mutual capacitance between the first electrode 5011 and the second electrode 5012. An angle between the second branch electrode 50122 and the second trunk electrode 50121 is equal to 45 degrees. Each second trunk electrode 50121 extends two second branch electrodes 50122 disposed symmetrically with respect to the second trunk electrode 50121 close to the intersection of the first electrode 5011 and the second electrode 5012.

The first electrode 5011 is disposed symmetrically with respect to the second trunk electrode 50121, and the second electrode 5012 is disposed symmetrically with respect to the first trunk electrode 50111.

A width of the second trunk electrode 50121 is greater than or equal to the width of 5 sub-pixels, a width of the second narrowed trunk 50123 in a width direction of the second trunk electrode 50121 is greater than or equal to the width of 3 sub-pixels, and the width of the second narrowed trunk 50123 in the width direction of the second trunk electrode 50121 decreases from close to the second trunk electrode 50121 to far away from the second trunk electrode 50121.

Specifically, the second trunk electrode 50121 and the second narrowed trunk 50123 are both composed of metal wires. Each metal wire is disposed around a sub-pixel, and the second trunk electrode 50121 surrounds at least 5 sub-pixels along the width direction of the second trunk electrode 50121 to realize that the width of the second trunk electrode 50121 is greater than or equal to the width of 5 sub-pixels. The second narrowed trunk 50123 surrounds at least 3 sub-pixels in the width direction of the second trunk electrode 50121 to realize that the width of the second narrowed trunk 50123 in the width direction of the second trunk electrode 50121 is greater than or equal to the width of 3 sub-pixels. The width of the second narrowed trunk 50123 in the width direction of the second trunk electrode 50121 decreases from close to the second trunk electrode 50121 to away from the second trunk electrode 50121 to reduce an impedance of the second electrode channel at the intersection of the first electrode 5011 and the second electrode 5012, to reduce a resistance-capacitance delay of the second electrode channel, and time required for the touch layer 50 to be scanned is further reduced, thereby increasing the touch report rate.

In the embodiment, two adjacent second branch electrodes 50122 of two adjacent touch units 501 in the second direction are connected at an end away from the second connecting portion 505 to electrically connect the second branch electrodes 50122 of the touch unit 501 disposed in a same row in the second direction, increase a current transmission channel in the second electrode 5012, reduce the impedance of the second electrode channel, and improve the touch report rate.

In the embodiment, in the second direction, a region enclosed by the second trunk electrodes 50121 of the two adjacent touch units 501 and the two adjacent second branch electrodes 50122 is provided with a first hollow portion 5071. A first floating electrode 5061 is provided in the first hollow portion 5071, and the first floating electrode 5061 is electrically insulated from the first electrode 5011 and the second electrode 5012. The first hollow portion 5071 is configured to reduce an area of the second electrode 5012, thereby reducing a parasitic capacitance between the second electrode 5012 and the common cathode. The first floating electrode 5061 is configured to improve uniformity of light emitted by the display panel 10 through the touch layer 50.

In the embodiment, a region enclosed by the first trunk electrode 50111 and the two adjacent second branch electrodes 50122 of the two adjacent touch units 501 in the first direction is provided with a second hollow portion 5072. A second floating electrode 5062 is provided in the second hollow portion 5072, and the second floating electrode 5062 is electrically insulated from the first electrode 5011 and the second electrode 5012 to reduce the parasitic capacitance between the second electrode 5012 and the common cathode. In addition, the two second branch electrodes 50122 of the two adjacent touch units 501 in the first direction are electrically insulated to prevent a short circuit between the two adjacent second electrodes 5012 in the first direction.

The touch layer 50 further comprises a third floating electrode 5063. The third floating electrode 5063 is disposed between the first branch electrode 50112 and the second branch electrode 50122 surrounding the first branch electrode 50112. The third floating electrode 5063 is electrically insulated from the first electrode 5011 and the second electrode 5012 to prevent short circuit between the first branch electrode 50112 and the second branch electrode 50122 surrounding the first branch electrode 50112, and is beneficial to improve production yield. The third floating electrode 5063 disposed between the first branch electrode 50112 and the second branch electrode 50122 surrounds at least one sub-pixel along a width direction of the third floating electrode 5063.

In the embodiment, the first floating electrode 5061, the second floating electrode 5062, and the third floating electrode 5063 are all disposed in the same layer as the first electrode 5011 and the second electrode 5012. The first floating electrode 5061, the second floating electrode 5062, the third floating electrode 5063, the first electrode 5011, and the second electrode 5012 are all composed of metal wires.

Figure 7:
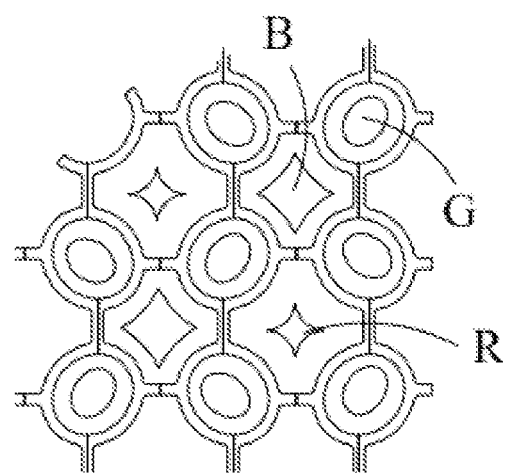
FIG. 7 is a schematic view of sub-pixels surrounded by metal wires composed of the first electrode and the second electrode of the present invention.

Shown in FIG. 7 is a schematic view of the sub-pixels surrounded by the metal wires composed of the first electrode and the second electrode of the present invention. In the embodiment, the sub-pixels comprise elliptical sub-pixels and quadrilateral sub-pixels, and the quadrilateral sub-pixels have four concave arc-shaped edges. In order to adapt to a shape of the sub-pixel, the metal wire comprises a first metal wire and a second metal wire. The first metal wire is an oval metal wire, and the second metal wire is an octagonal metal wire. The second metal wire is composed of four parts of the first metal wire and a metal connecting section between two adjacent first metal wires. Both the blue sub-pixel B and the red sub-pixel R are surrounded by the second metal wire. The green sub-pixel G is surrounded by the first metal wire. It is understandable that the shape of the sub-pixels can also be diamonds, rectangles, etc. Correspondingly, the shape of the metal wire is a diamond.

A width of the first connecting portion 504 in an extending direction perpendicular to the first connecting portion 504 is greater than or equal to the width of 3 sub-pixels.

Specifically, since the first connecting portion 504 is composed of the metal wires, the metal wires need to be disposed around the sub-pixels, and the first connecting portion 504 surrounds at least 3 sub-pixels in the extending direction perpendicular to the first connecting portion 504 to realize that the width of the first connecting portion 504 in the extending direction perpendicular to the first connecting portion 504 is greater than or equal to the width of 3 sub-pixels. That is, in the embodiment of the present invention, "the width of the first connecting portion 504 in the extending direction perpendicular to the first connecting portion 504 is greater than or equal to the width of 3 sub-pixels" is directly reflected in a structure of the first connecting portion that the first connecting portion 504 surrounds at least 3 subpixels in the direction extending perpendicular to the first connecting portion 504. For example, the first connecting portion surrounds 3 sub-pixels, 4 sub-pixels, 5 sub-pixels, and 6 sub-pixels in the extending direction perpendicular to the first connecting portion 504. As shown in FIG. 5, the first connecting portion 504 surrounds 3 green sub-pixels G in the extending direction perpendicular to the first connecting portion 504. Compared with the traditional technology, surrounding a sub-pixel causes the impedance of the first connecting portion to be larger, in the present invention, the width of the first connecting portion 504 in the extending direction perpendicular to the first connecting portion 504 is greater than or equal to the width of 3 sub-pixels, so that the width of the first connecting portion 504 is increased relative to the traditional technology, thereby reducing the impedance of the first connecting portion 504, and it is beneficial to improve a resistance-capacitance delay generated when an electrical signal is transmitted through the first electrode 5011, and is beneficial to increase a touch scanning frequency, thereby improving the touch report rate.

It should be noted that a design of an arrangement of the sub-pixels on the display panel does not change. The metal wires on the touch layer surround the sub-pixels. The present invention takes the sub-pixels as a reference object, increases the number of metal wires that make up the first connecting portion, makes the metal wires adapted to surround the sub-pixels, so that the number of sub-pixels surrounded by the metal wires constituting the first connecting portion increases, and the width of the first connecting portion relative to the traditional technology increases. The increase in the number of metal wires composing the first connecting portion reduces a resistance of the first connecting portion compared to a resistance of the first connecting portion in the traditional technology.

Each second connecting portion 505 comprises at least one second metal wire 5051 extending in the second direction. Each second metal wire 5051 comprises a plurality of second surrounding sections 5051a disposed in the second direction and arranged side by side. A straight line where the plurality of second surrounding sections 5051a of each second metal wire 5051 are disposed is parallel to the second direction.

In the present invention, the width of the first connecting portion 504 in the extending direction perpendicular to the first connecting portion 504 is greater than or equal to the width of 3 sub-pixels to reduce the impedance of the first connecting portion 504. On the basis, if a traditional design of a V-shaped bridge wire is used to realize an electrical connection of the second electrode 5012, a basic capacitance between the V-shaped bridge wire and the first electrode 5011 will increase. In view of this, compared to the V-shaped bridge wire in the traditional technology, the V-shaped bridge wire is arranged in a V shape, which results in a large length of the V-shaped bridge wire and a large overlapping area with the first electrode. In the present invention each second connecting portion 505 comprises at least one second metal wire 5051 extending along the second direction, and the plurality of second surrounding sections 5051a of each second metal wire 5051 are distributed in a straight line and the straight line is parallel to the second direction, and a height of each second surrounding section 5051a in the first direction is small, so that a length of the second metal wire 5051 is less than a length of the V-shaped bridge wire, and an overlapping area between the second metal wire constituting the second connecting portion 505 and the first electrode 5011 is reduced, so that a basic capacitance between the second connecting portion 505 and the first electrode 5011 is reduced. The width of each first connecting portion 504 in an extending direction perpendicular to the first connecting portion 504 is greater than or equal to the width of 3 sub-pixels, and with the second connecting portion 505 comprising a second surrounding section 5051a disposed in a straight line in the second direction, the effect of lowering the resistance of the first connecting portion 504 and lowering the base capacitance is achieved, thereby increasing the touch report rate.

Further, in the present invention, the second connecting portion 505 comprises a second surrounding section 5051a arranged linearly in the second direction to shorten a length of the second connecting portion 505, thereby reducing the basic capacitance formed between the second connecting portion 505 and the first electrode. At the same time, by increasing the width of the first connecting portion 504 in the extending direction perpendicular to the first connecting portion 504 to reduce the impedance of the first connecting portion. On this basis, only when the width of the first connecting portion 504 meets certain conditions, can the resistance of the first connecting portion 504 meet the requirements, and the basic capacitance formed between the second connecting portion 505 and the first electrode does not increase significantly, so that the resistance and the basic capacitance of the first connecting portion 504 both meet basic touch performance requirements. After a lot of research in the present invention, it is found that the width of the first connecting portion 504 in the extending direction perpendicular to the first connecting portion 504 is less than or equal to the width of 10 sub-pixels (specifically, on a structure of the first connecting portion, the number of surrounding sub-pixels is less than or equal to 10), which can ensure that the resistance and basic capacitance of the first connecting portion 504 meet the basic touch performance requirements. The first connecting portion 504 is too wide to reduce the resistance, which will cause the basic capacitance formed between the improved second connecting portion 505 and the widened first connecting portion 504 to be too large, and the too large basic capacitance has an adverse effect on the touch report rate.

Furthermore, when the width of the first connecting portion 504 perpendicular to the extending direction of the first connecting portion 504 is greater than or equal to the width of 3 sub-pixels and less than or equal to the width of 5 sub-pixels, the resistance corresponding to the first connecting portion 504 of the present invention is less than the corresponding resistance when the first connecting portion surrounds a sub-pixel in the traditional technology, and an overlapping area between the first connecting portion and the second connecting portion of the present invention is less than an overlapping area between the V-shaped bridge wire and the first connecting portion surrounding a sub-pixel in the traditional technology. The basic capacitance between the first electrode and the second electrode of the present invention is less than that in the traditional technology, and the resistance of the first connecting portion is reduced in conjunction with the reduction of the basic capacitance, so that the touch report rate corresponding to the present invention is better than the touch report rate corresponding to a traditional technical solution.

Specifically, the first connecting portion 504 surrounds 3 to 5 sub-pixels in the extending direction perpendicular to the first connecting portion 504 to realize that the width of the first connecting portion 504 in the extending direction perpendicular to the first connecting portion 504 is greater than or equal to the width of 3 sub-pixels and less than or equal to the width of 5 sub-pixels. That is, in the embodiment of the present invention, "the width of the first connecting portion 504 in the extending direction perpendicular to the first connecting portion 504 is greater than or equal to the width of 3 sub-pixels and less than or equal to the width of 5 sub-pixels" directly shown in the structure of the first connecting portion is that the first connecting portion 504 surrounds 3 sub-pixels to 5 sub-pixels in the extending direction perpendicular to the first connecting portion 504.

In the embodiment, each first connecting portion 504 comprises at least three first metal wires 5041 extending in the first direction and spaced apart from each other. Compared with a traditional first connecting portion being the metal wire as shown in FIG. 7, the present invention removes a connecting lines between the metal wires, and removes a portion of the metal wires to form at least three first metal wires 5041 spaced apart from each other, and to prevent an overlap between the removed connecting line and the portion of the metal wires and the second connecting portion 505, which will cause the basic capacitance between the first electrode 5011 and the second electrode 5012 to increase. The first metal wires 5041 arranged at intervals refer to that the first metal wires 5041 are not connected, have a certain distance, and do not cross each other.

In the embodiment, each second connecting portion 505 comprises a plurality of second metal wires 5051 extending in the second direction and spaced apart from each other. Compared with the traditional technology, each V-shaped bridge wire is composed of two metal wires and a connecting section connecting the two metal wires, the second connecting portion 505 of the present invention removes the connecting section and a portion of the metal wires between two adjacent second metal wires 5051, so as to reduce an overlapping area between the second connecting portion 505 and the first electrode 5011, and acts to further reduce the base capacitance between the first electrode 5011 and the second electrode 5012. A spacing between any two of the plurality of second metal wires 5051 extending in the second direction and arranged at intervals is equal.

Specifically, each second connecting portion 505 comprises three second metal wires 5051 extending in the second direction and spaced apart from each other. In other embodiments, each second connecting portion 505 may also comprise two second metal wires 5051 extending in the second direction and spaced apart from each other. Each second connecting portion 505 may also comprise four or five second metal wires 5051.

In other embodiments, each first connecting portion 504 comprises at least three first metal wires 5041 extending in the first direction and spaced apart from each other, or, each second connecting portion 505 comprises a plurality of second metal wires 5051 extending in the second direction and spaced apart from each other.

It should be noted that, as shown in FIG. 5, each first metal wire 5041 is electrically connected to two first narrowed trunks 50113 at the intersection of the first electrode 5011 and the second electrode 5012. Each second metal wire 5051 is electrically connected to two second narrowed trunk 50123 at the intersection of the first electrode 5011 and the second electrode 5012. A portion of the metal wires disposed on both sides of the first connecting portion 504 and close to the first connecting portion 504 (such as the two metal wires on both sides of the three first metal wires 5041) are disposed in the same layer as the first connecting portion 504. The metal wire is disconnected from the second electrode through a fracture of the metal wire in the second direction (as shown in the square dashed box). The metal wire is not electrically connected in the first direction, so the metal wire does not belong to the first metal wire.

An orthographic projection of the second connecting portion 505 on the touch layer 50 and an orthographic projection of the first connecting portion 504 on the touch layer 50 intersect and form a plurality of wire patterns. The wire pattern surrounds an orthographic projection of at least three sub-pixels on the touch layer in the second direction. Compared with the traditional technology, the metal wire forming the first connecting portion surrounds a sub-pixel in the second direction, an orthographic projection of the wire pattern surrounding at least three sub-pixels on the touch layer in the second direction can effectively reduce the impedance of the first electrode channel, thereby effectively reducing a charging time of the basic capacitance formed between the first electrode and the second electrode on the touch layer, increasing a scanning frequency of the first electrode and the second electrode of the touch screen, which is beneficial to realize a high touch report rate.

In each of the wire patterns, a length of an overlapping portion of the orthographic projection of the first connecting portion 504 on the touch layer 50 and the orthographic projection of the second connecting portion 505 on the touch layer 50 is greater than 0 and less than a length of each metal wire. Compared with the traditional technology, when the second connecting portion 505 is a V-shaped bridge wire, the overlapping portion between the second connecting portion 505 and the first electrode is a plurality of metal wires, a corresponding length of the overlapping portion between the first connecting portion 504 and the second connecting portion 505 in each grid wire of the present invention is less than the length of each metal wire, which can reduce the basic capacitance between the first electrode 5011 and the second electrode 5012.

Furthermore, in each of the wire patterns, the length of the overlapping portion of the orthographic projection of the first connecting portion 504 on the touch layer 50 and the orthographic projection of the second connecting portion 505 on the touch layer 50 is greater than 0 or equal to ½ of the length of each of the metal wires to further reduce the basic capacitance between the first electrode 5011 and the second electrode 5012.

In the embodiment, each first metal wire 5041 comprises at least one first surrounding section 5041a arranged along the first direction, and each first surrounding section 5041a of the first metal wire 5041 is a part of each of the metal wires;

each of the second surrounding sections 5051a of each of the second metal wires 5051 is a part of each of the metal wires;

the first surrounding section 5041a of each first metal wire 5041 corresponds to the second surrounding section 5051a of each second metal wire 5051 in a one-to-one correspondence, and an orthographic projection of each first surrounding section 5041a on the touch layer 50 and an orthographic projection of the second surrounding section 5051a corresponding to the first surrounding section 5041a on the touch layer 50 overlap and form one of the wire patterns.

Further, each of the first metal wires 5041 comprises a plurality of first surrounding sections 5041a arranged along the first direction. In the first direction, two adjacent first surrounding sections 5041a are connected by a first metal connecting section 501a. The first metal connecting section 501a is linear. Two first surrounding sections 5041a connected to a same first metal connecting section 501a are disposed on opposite sides of the first metal connecting section 501a. Each of the second metal wires 5051 comprises a plurality of second surrounding sections 5051a arranged along the second direction. In the second direction, two adjacent second surrounding sections 5051a are connected by a second metal connecting section 501b. The second metal connecting section 501b is linear. Two second surrounding sections 5051a connected to a same second metal connecting section 501b are disposed on a same side of the second metal connecting section 501b.

It should be noted that the first surrounding section 5041a and the second surrounding section 5051a of the present invention are metal wires surrounding the sub-pixels. The first surrounding section 5041a and the second surrounding section 5051a may be straight lines, for example, when the metal wire is a diamond-shaped metal wire. The first surrounding section 5041a and the second surrounding section 5051a may also be curved. For example, when the metal wire comprises an elliptical metal wire. In addition, the first metal wire 5041 constituting the first connecting portion 504 is formed by a remaining portion after removing a portion of the metal wire. For example, removing a portion of the connecting sections of the metal wire in the second direction, then removing a portion of each of the metal wires, and leaving the first surrounding section 5041a and the first metal connecting section 501a to form first metal lines spaced apart from each other.

In the embodiment, each first surrounding section 5041a and each second surrounding section 5051a corresponding to the first surrounding section 5041a collectively surround a sub-pixel. As shown in FIG. 5, each first surrounding section 5041a and each second surrounding section 5051a corresponding to the first surrounding section 5041a collectively surround a green sub-pixel G. When the metal wires comprise elliptical metal wires, both the first surrounding section 5041a and the second surrounding section 5051a comprise elliptical arc sections, and each wire pattern is a portion of a metal wire.

A length of each first surrounding section 5041a is greater than 0 and less than or equal to ½ of the length of each metal wire, and a length of each second surrounding section 5051a is greater than 0 and less than or equal to ½ of the length of each metal wire to reduce an overlapping area between each first surrounding section 5041a and the corresponding second surrounding section 5051a.

Specifically, the length of each first surrounding section 5041a and the length of each second surrounding section 5051a are equal to ½ of the length of a metal wire, and the length of the overlapping portion of the orthographic projection of each first surrounding section 5041a on the touch layer 50 and the orthographic projection of the second surrounding section 5051a corresponding to the first surrounding section 5041a on the touch layer 50 is equal to ¼ of the length of each metal wire to minimize the overlapping area between the first connecting portion 504 and the second connecting portion 505, thereby minimizing the basic capacitance between the first electrode 5011 and the second electrode 5012. It is understandable that by adjusting the length of at least one of the first surrounding section 5041a and the second surrounding section 5051a, the length of the overlapping portion of the orthographic projection of each first surrounding section 5041a on the touch layer 50 and the orthographic projection of the second surrounding section 5051a corresponding to the first surrounding section 5041a on the touch layer 50 may also be greater than ¼ of the length of each metal wire and less than ½ of the length of each metal wire. For example, 9/20 of the length of each metal wire, or 5/12 of the length of each metal wire.

Figure 8:
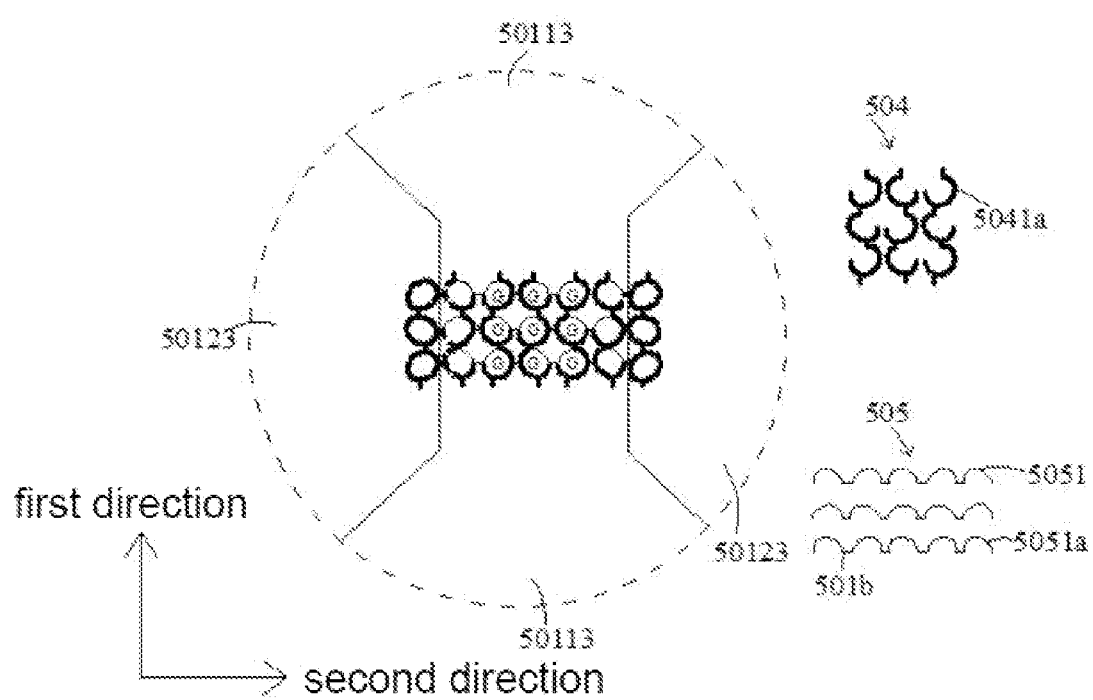
FIG. 8 is a second enlarged schematic view of the touch unit shown in FIG. 4 at the intersection of the first electrode and the second electrode.

Shown in FIG. 8 is a second enlarged schematic view of the touch unit shown in FIG. 4 at the intersection of the first electrode and the second electrode. The length of the overlap of the orthographic projection of each first surrounding section 5041a on the touch layer 50 and the orthographic projection of the second surrounding section 5051a corresponding to the first surrounding section 5041a on the touch layer 50 is the same as in FIG. 5. A difference is that each wire pattern composed of the orthographic projection of each first surrounding section 5041a on the touch layer 50 and the orthographic projection of the second surrounding section 5051a corresponding to the first surrounding section 5041a on the touch layer 50 is the same as each of the metal wires. That is, each wire pattern is exactly a metal wire. For example, the wire pattern comprises an oval metal wire and an octagonal metal wire. Light emitted by the display panel has optical uniformity after passing through this region. The length of the first surrounding section 5041a is greater than ½ of the length of a metal wire and less than the length of a metal wire, and the length of the second surrounding section 5051a is equal to ½ of the length of a metal wire.

It should be noted that a design of the first connecting portion and the second connecting portion of the present invention can also be applied to a case where the sub-pixels are traditional diamond, rectangle or rectangle, and the corresponding metal wire is diamond. By making the first connecting portion 504 surround at least three sub-pixels in the second direction, and adjusting the traditional V-shaped bridge wire to a metal surrounding section disposed in the first direction, the basic capacitance is reduced. Therefore, while reducing the resistance of the first connecting portion, the basic capacitance between the first electrode and the second electrode is reduced, and the two cooperate to improve the report rate of the touch display device.

The description of the above embodiments is only used to help understand the technical solutions and core ideas of the present invention. One of ordinary skill in the art should understand that they may still modify the technical solutions described in the preceding examples, or replace some of the technical features with equivalent ones, and that such modifications or replacements do not take the essence of the corresponding technical solutions out of the scope of the technical solutions of the embodiments of the present invention.

What is claimed is:

1. A touch display device, comprising:
a touch layer and a display panel, wherein the touch layer is located on a light emitting side of the display panel, the display panel comprises a plurality of sub-pixels, the touch layer comprises a plurality of touch units, and each of the touch units comprises:
a first electrode electrically connected by a first connecting portion in a first direction, the first connecting portion surrounds at least 3 sub-pixels in an extension direction perpendicular to the first connecting portion, and the first connecting portion and the first electrode are provided in a same layer.

2. The touch display device as claimed in claim 1, wherein each of the touch units further comprises a second electrode bridged by a second connecting portion in a second direction, the second connecting portion comprises at least one second metal wire extending in the second direction, and each second metal wire comprises a plurality of second surrounding sections arranged in the second direction and arranged side by side; and
the second connecting portion and the first connecting portion are located on different layers, the second electrode is electrically insulated from the first electrode, and the first direction is different from the second direction.

3. The touch display device as claimed in claim 2, wherein an orthographic projection of the second connecting portion on the touch layer intersects an orthographic projection of the first connecting portion on the touch layer and forms a plurality of wire patterns.

4. The touch display device as claimed in claim 3, wherein the first electrode and the second electrode are composed of multiple metal wires; and
in each of the wire patterns, a length of an overlapping portion of the orthographic projection of the first connecting portion on the touch layer and the orthographic projection of the second connecting portion on the touch layer is greater than 0 and less than a length of each of the metal wires.

5. The touch display device as claimed in claim 4, wherein each of the wire patterns, the length of the overlapping portion of the orthographic projection of the first connecting portion on the touch layer and the orthographic projection of the second connecting portion on the touch layer is greater than 0 or equal to ½ of the length of each of the metal wires.

6. The touch display device as claimed in claim 4, wherein each first connecting portion comprises at least three first metal wires extending in the first direction and spaced apart from each other, and/or each second connecting portion comprises a plurality of the second metal wires extending in the second direction and spaced apart from each other.

7. The touch display device as claimed in claim 4, wherein each first connecting portion comprises at least three first metal wires extending in the first direction and spaced apart from each other, each first metal wire comprises at least one first surrounding section arranged along the first direction, and each first surrounding section of the first metal wire is a part of each of the metal wires;
each of the second connecting portions comprises a plurality of the second metal wires extending in the second direction and spaced apart from each other, and each of the second surrounding sections of each of the second metal wires is a part of each of the metal wires; and
the first surrounding section of each first metal wire corresponds to the second surrounding section of each second metal wire in a one-to-one correspondence, and an orthographic projection of each first surrounding section on the touch layer and an orthographic projection of the second surrounding section corresponding to the first surrounding section on the touch layer partially overlap and form one of the wire patterns.

8. The touch display device as claimed in claim 7, wherein a length of each first surrounding section is greater than 0 and less than or equal to ½ of the length of each metal wire, and a length of each second surrounding section is greater than 0 and less than or equal to ½ of the length of each metal wire.

9. The touch display device as claimed in claim 7, wherein each first surrounding section and each second surrounding section corresponding to the first surrounding section collectively surround one of the sub-pixels.

10. The touch display device as claimed in claim 7, wherein the metal wires comprise elliptical metal wires, and both the first surrounding section and the second surrounding section comprise elliptical arc sections.

11. The touch display device as claimed in claim 4, wherein at least one of the wire patterns is same as one of the metal wires, and/or at least one of the wire patterns is a part of the metal wire.

12. The touch display device as claimed in claim 1, wherein the first connecting portion surrounds at most 10 sub-pixels in the extension direction perpendicular to the first connecting portion.

13. The touch display device as claimed in claim 2, wherein each first electrode comprises two first narrowed trunks and two first trunk electrodes connected by the first connecting portion, each of the first trunk electrodes is connected to one of the first narrowed trunks, and each of the first trunk electrodes extends in the first direction; and each second electrode comprises two second narrowed trunks and two second trunk electrodes connected by the second connecting portion, each of the second trunk electrodes is connected to one of the second narrowed trunks, each of the second trunk electrodes extends in the second direction, and the first direction is perpendicular to the second direction.

14. The touch display device as claimed in claim 13, wherein the first trunk electrode surrounds at least 5 sub-pixels along a width direction of the first trunk electrode, the first narrowed trunk surrounds at least 3 sub-pixels in the width direction of the first trunk electrode, and a width of the first narrowed trunk along the width direction of the first trunk electrode decreases from being close to the first trunk electrode to away from the first trunk electrode; and the second trunk electrode surrounds at least 5 sub-pixels along a width direction of the second trunk electrode, the second narrowed trunk surrounds at least 3 sub-pixels in the width direction of the second trunk electrode, and a width of the second narrowed trunk in the width direction along the second trunk electrode decreases from being close to the second trunk electrode to away from the second trunk electrode.

15. The touch display device as claimed in claim 13, wherein each first electrode further comprises a first branch electrode extending from an end of the first trunk electrode close to the first connecting portion, the second electrode further comprises a second branch electrode extending from an end of the second trunk electrode close to the second connecting portion, and each second branch electrode surrounds one of the first branch electrodes adjacent to the second branch electrode.

16. The touch display device as claimed in claim 15, wherein two adjacent second branch electrodes of two adjacent touch units in the second direction are connected at an end away from the second connecting portion.

17. The touch display device as claimed in claim 16, wherein in the second direction, an area enclosed by the second trunk electrodes and the two adjacent second branch electrodes in the two adjacent touch units is provided with a first hollow portion, the first hollow portion is provided with a first floating electrode, and the first floating electrode is electrically insulated from the first electrode and the second electrode.

18. The touch display device as claimed in claim 17, wherein in the first direction, an area enclosed by the first trunk electrodes and the two adjacent second branch electrodes in the two adjacent touch units is provided with a second hollow portion, a second floating electrode is provided in the second hollow portion, and the second floating electrode is electrically insulated from the first electrode and the second electrode.

* * * * *